United States Patent [19]
Rosenthal

[11] Patent Number: 5,439,855
[45] Date of Patent: Aug. 8, 1995

[54] SILICON NITRIDE CERAMICS CONTAINING A DISPERSED PENTAMOLYBDENUM TRISILICIDE PHASE

[75] Inventor: Allan B. Rosenthal, Wilmington, Del.

[73] Assignee: Lanxide Technology Company, L.P., Newark, Del.

[21] Appl. No.: 933,956

[22] Filed: Aug. 21, 1992

Related U.S. Application Data

[63] Continuation of Ser. No. 719,427, Jun. 24, 1991, abandoned.

[51] Int. Cl.$^6$ .............................................. C04B 35/58
[52] U.S. Cl. ...................................... 501/97; 501/87; 501/92
[58] Field of Search ................... 501/96, 97, 98, 87, 501/92

[56] References Cited

U.S. PATENT DOCUMENTS

| | | | |
|---|---|---|---|
| 3,002,936 | 10/1961 | Allenbach et al. | 252/518 |
| 3,409,417 | 11/1968 | Yates | 29/182.5 |
| 4,332,909 | 6/1982 | Nishida et al. | 501/97 |
| 4,407,971 | 10/1983 | Komatsu et al. | 501/97 |
| 4,644,133 | 2/1987 | Atsumi et al. | 219/270 |
| 4,746,636 | 5/1988 | Yokoyama | 501/97 |
| 4,923,829 | 5/1990 | Yasutomi et al. | 501/95 |
| 4,983,554 | 1/1991 | Hsieh | 501/97 |
| 5,023,214 | 6/1991 | Matsumoto et al. | 501/97 |

OTHER PUBLICATIONS

*Chemical Abstracts*, vol. 99, No. 12, 1983; Abstract No. 92717J, "High Strength Silicon Nitride Sinters", Sumitomo Electric Industries.

R. Matsumoto, "A New Cutting Tool Material–A Silicon Nitride/Intermetallic Silicide Composite", *Materials and Processing Report*, Apr. 1991, pp. 5–6.

*Primary Examiner*—Deborah Jones

[57] ABSTRACT

A sintered silicon nitride ceramic product that has high strength at both ambient and elevated temperatures, good oxidation resistance at high temperatures and retention of strength after exposure to oxidizing conditions contains 1 to 80 wt. % $Mo_5Si_3$.

11 Claims, No Drawings

5,439,855

SILICON NITRIDE CERAMICS CONTAINING A DISPERSED PENTAMOLYBDENUM TRISILICIDE PHASE

This application is a continuation of application Ser. No. 07/719,427 filed Jun. 24, 1991 now abandoned.

FIELD OF THE INVENTION

This invention relates to sintered silicon nitride ceramics.

BACKGROUND OF THE INVENTION

Silicon nitride is of great interest for structural and electronic applications because of its excellent high temperature strength, good thermal shock resistance, good wear resistance and chemical inertness. Silicon nitride materials have traditionally been fabricated by one of three methods: (1) the direct nitridation of silicon powder at high temperatures, (2) densification of commercially available silicon nitride powder at high temperatures by the addition of metal oxide powders known as sintering aids, and (3) densification of commercially available silicon nitride powder at high temperatures and pressures, a process known as hot pressing. These silicon nitride materials have been used in structural applications such as cutting tools and gas turbines.

Although silicon nitride ceramics having satisfactory mechanical properties at ambient and modestly high temperatures are available, many are not suitable for high temperature applications because their toughness, wear resistance and strength are often degraded at temperatures greater than 1000° C. In the case of cutting tool inserts, wear resistance is a particularly important property. Undesirable phase transformations within the insert and chemical reactivity with the metal being worked on cause a deterioration in properties as the temperature rises at the high feeding and rotating speeds used for milling and turning operations.

Various methods have been proposed for improving the high temperature properties of silicon nitride ceramics. For example, a sintered ceramic product exhibiting high strength, toughness and hardness at elevated temperatures is described in U.S. Pat. No. 5,023,214. The product consists of silicides of Fe, Ni or Co uniformly dispersed in a silicon nitride matrix. Silicon nitride compositions containing $MoSi_2$ have also been prepared. For example, U.S. Pat. No. 3,002,936 discloses a sintered mixture of silicon nitride and $MoSi_2$ for applications requiring low electrical resistance as well as high thermal shock resistance. U.S. Pat. No. 3,409,417 discloses a dense, homogeneous interdisposition of silicon nitride and molybdenum metal in which up to half the volume of silicon nitride can be replaced by the silicides and disilicides of Cr, Mo and W. U.S. Pat. No. 4,407,971 describes a sintered ceramic body having high density, high flexural strength, and high impact resistance comprising silicon nitride, $MoSi_2$, AlN, yttria and alumina. U.S. Pat. No. 4,644,133 discloses a ceramic heater element made from a mixture including $MoSi_2$ and silicon nitride powder as a main ingredient and silicon dioxide powder as an additive. U.S. Pat. No. 4,983,554 discloses a sintered silicon nitride ceramic consisting of silicon nitride, $MoSi_2$, AlN, yttria and alumina. The sintered compositions are formed by pressing a mixture of the powders at room temperature, followed by firing in a nitrogen atmosphere at 1700° to 1800° C. However, no compositions have been disclosed that comprise a homogeneous dispersion of a $Mo_5Si_3$ phase in a silicon nitride matrix.

SUMMARY OF THE INVENTION

The sintered ceramic products of this invention comprise (a) from about 20 to about 98% silicon nitride, (b) from about 1 to about 80% of $Mo_5Si_3$ and (c) from 0.02 to about 20% of at least one oxide, nitride or silicate of an element selected from IUPAC groups 2, 3, 4, 13 or the lanthanide series, all percentages being by weight based on the total weight of the product.

The products have high strength at both ambient and elevated temperatures, good oxidation resistance at high temperatures and retention of strength after exposure to oxidizing conditions.

DETAILED DESCRIPTION OF THE INVENTION

Since $Mo_5Si_3$ powder is not commercially available at the present time, a preferred method for preparing the sintered ceramic products of this invention comprises (1) intimately mixing a powder mixture of (a) 20 to 98% silicon nitride, (b) 1 to 80% molybdenum metal, or an oxide or alloy thereof, and (c) 0.02 to 20% of at least one oxide, nitride or silicate of an element of IUPAC group 2, 3, 4, 13 or the lanthanide series, all percentages being by weight based on the total weight of the powder mixture, (2) reacting the components of the powder mixture by heating to a temperature of 1300° to 1700° C. in a nonoxidizing atmosphere until the molybdenum is completely converted to $Mo_5Si_3$ and (3) maintaining the mixture at a temperature of 1300° to 1700° C. in the nonoxidizing atmosphere until the composition densifies. A combination of alumina and yttria is the preferred sintering aid. This process is described in more detail in U.S. Pat. No. 5,023,214.

The silicon nitride used in the process of this invention can be any commercially available silicon nitride powder. The silicon nitride is used in an amount of from about 50 to about 98%, based on the total weight of the composition.

Other refractory compounds, which can be chemically stable or unstable, can replace up to 50% by weight of the silicon nitride. For example, nitrides such as aluminum nitride, titanium nitride and boron nitride; carbides such as silicon carbide, titanium carbide and boron carbide; and borides such as titanium diboride, molybdenum diboride, and zirconium diboride can be used to replace silicon nitride. The refractory compound can be chosen to enhance a particular property of the resulting composite. For example, including titanium carbide or silicon carbide in the composition will give a harder product.

The silicon nitride powder is mixed with from about 1 to about 80%, preferably 5 to 25%, based on the total weight of the composition, of molybdenum metal. An oxide or alloy of molybdenum can also be used.

The powder mixture also includes from 0.02 to about 20%, preferably from 1 to about 10%, based on the total weight of the composition, of a sintering aid. Amounts higher than about 20% degrade the mechanical properties of the sintered product. The sintering aid is an oxide, nitride or silicate of an element of IUPAC groups 2, 3, 4, 13 or the lanthanide series, or mixtures thereof. Oxides of aluminum, magnesium, hafnium, calcium, strontium, zirconium and yttrium are preferred. A combination of aluminum oxide and yttrium oxide is most preferred. The silicate sintering aid can be added as such or can be formed in situ by the reaction of an oxide or nitride sintering aid with the silica that is always present on the surface of the silicon nitride powder. When a nitride sintering aid is used, it is sometimes desirable to add silica in addition to that which is inherently present on the surface of the silicon nitride. IUPAC group 1 oxides can be substituted for any of the oxide, nitride or silicate sintering aids in an amount of up to 50% by weight.

The powder mixtures of this invention are preferably densified by simultaneously heating and pressing. The preferred processing techniques are therefore hot pressing, hot isostatic pressing and gas pressure sintering. However, cold pressing followed by pressureless sintering will also yield the products of this invention.

The process for preparing the sintered product involves two steps. The powder mixture is first heated to between 1300° to 1700° C. and held for a time sufficient to convert the molybdenum, or an oxide or alloy thereof, to $Mo_5Si_3$. The molybdenum reacts completely with the silicon nitride to form $Mo_5Si_3$ while evolving nitrogen gas. The preferred temperature for the first step is between 1300° to 1500° C., since $MoSi_2$ begins to form at around 1700° C. The amount of time necessary to convert molybdenum to $Mo_5Si_3$ depends on the particle size of the powder mixture, the temperature, and the atmosphere. However, times between 30 minutes and two hours are typically used.

The temperature and time at temperature are then chosen so as to densify the $Mo_5Si_3$-containing product. Temperatures between 1300° to 1900° C. can be used. However, the preferred temperature range is from 1500° to 1700° C. If the temperature is too low, densification will be incomplete. If the temperature is too high, the silicon nitride will decompose. The high melting point of $Mo_5Si_3$ (greater than 1900° C.) contributes to the high temperature stability of the sintered product. The densification is preferably carried out at a pressure of at least 1000 psi, most preferably 2000 to 6000 psi. A nonoxidizing atmosphere such as nitrogen, hydrogen or helium is used to prevent oxidation of the molybdenum and the silicon nitride. A nitrogen atmosphere is preferred. Often both steps of reacting the silicon nitride with the molybdenum and the densification step can occur simultaneously, depending on the melting point of the sintering aid that is selected.

The sintered ceramic product comprises (a) from about 20 to about 98% silicon nitride, (b) from about 1 to about 80% $Mo_5Si_3$, and (c) from 0.02 to about 20% of at least one oxide, nitride or silicate of an element selected from IUPAC group 2, 3, 4, 13 or the lanthanide series, all percentages being by weight based on the total weight of the product.

The product is composed of microscopic "islands" of $Mo_5Si_3$ having a particle size of 0.1 to 10.0 microns homogeneously dispersed throughout a silicon nitride matrix. While the exact mechanism is not known, the morphology of the sintered product of this inveniton is believed to result from a high temperature disproportionation reaction promoted by the sintering aid. The sintering aid performs a dual role: it first provides a liquid phase during heating that acts as a high temperature "solvent" for both the nitride and the molybdenum (or molybdenum oxide or alloy) and then helps in the consolidation of the material via sintering. The X-ray diffraction pattern of the sintered product indicates that the product is a composite of silicon nitride and $Mo_5Si_3$. There is no free molybdenum metal or molybdenum oxide present.

The sintered ceramic product of this invention has a wide variety of applications in the structural ceramics area. Because the material has a theoretical density of less than 5, it is suitable for uses where a high strength/weight ratio is important. The unique mechanical properties of the product make it especially suited for use in the manufacture of cutting tools. The material can also be used in the manufacture of turbine engines, valve seals, bearings and other parts requiring exceptional wear resistance.

EXAMPLE 1

The following ingredients are milled using a SWECO vibratory mill equipped with silicon nitride grinding media: silicon nitride (163.8 g), molybdenum (20.0 g), yttria (10.8 g), alumina (5.4 g), RHOPLEX® B-60A polyacrylate emulsion supplied by Rohm & Haas Co. as a dispersant (2.0 ml) and water (200 g). The mixture is milled for 16 hours and the resulting slurry is spray dried using a laboratory spray dryer supplied by Yamato Corp.

Bars (2.5"×0.5", 6.35×1.27 cm) are formed by pressing the powder on a Carver uniaxial hydraulic press at 15 Ksi (103 MPa). The bars are placed in a graphite crucible and packed with silicon nitride powder. All samples are pressureless sintered under a nitrogen atmosphere under the conditions indicated in Table I.

TABLE I

| °C./min | Temp. (°C.) | Hold (min) | Major Phases | Density (g/cc) |
|---|---|---|---|---|
| 20 | 1500 | 180 | $Si_3N_4$, $Mo_5Si_3$ | 3.14 |
| 20 | 1500 | 60 | $Si_3N_4$, | 3.29 |
| 10 | 1700 | 120 | $Mo_5Si_3$, $MoSi_2$ | |
| 20 | 1500 | 60 | $Si_3N_4$, | 3.14 |
| 10 | 1625 | 120 | $Mo_5Si_3$ | |

EXAMPLE 2

The following ingredients are placed into a SWECO mill and milled in 200 ml of water for 16 hours.

| | | |
|---|---|---|
| 5 wt. % Mo (3a) | Silicon nitride | 432.5 g |
| | Molybdenum powder | 25.0 g |
| | Yttria | 28.5 g |
| | Alumina | 14.0 g |
| 10 wt. % Mo (3b) | Silicon nitride | 409.5 g |
| | Molybdenum powder | 50.0 g |
| | Yttria | 27.0 g |
| | Alumina | 13.5 g |
| 15 wt. % Mo (3c) | Silicon nitride | 387.0 g |
| | Molybdenum powder | 75.0 g |
| | Yttria | 25.5 g |
| | Alumina | 12.5 g |
| 5 wt. % Mo + 10 wt. % AlN (3d) | Silicon nitride | 382.5 g |
| | Molybdenum powder | 25.0 g |
| | Yttria | 28.5 g |
| | Alumina | 14.0 g |
| | Aluminum nitride | 50.0 g |

The resulting slurries are spray dried as described in Example 1. The powders are hot pressed at 4 Ksi (28 MPa) pressure under nitrogen to form three-inch disks under the conditions indicated in Table II.

TABLE II

| Powder | Hot Pressing Conditions | | Density (g/cc) | Major Phases |
|---|---|---|---|---|
| | Temp. (°C.) | Hold (min) | | |
| | °C./min | | | |
| 3a (5% Mo) | 10 | 1500 | 60 | Porous | $Si_3N_4$, $Mo_5Si_3$ |
| 3a (5% Mo) | 10 | 1500 | 60 | 3.28 | $Si_3N_4$, |
| | 10 | 1550 | 120 | | $Mo_5Si_3$ |
| 3a (5% Mo) | 10 | 1700 | 120 | 3.48 | $Si_3N_4$, $Mo_5Si_3$ |
| 3b (10% Mo) | 10 | 1600 | 120 | 3.45 | $Si_3N_4$, $Mo_5Si_3$ |
| 3b (10% Mo) | 10 | 1700 | 120 | 3.38 | $Si_3N_4$, $Mo_5Si_3$, $MoSi_2$ |
| 3c (15% Mo) | 10 | 1600 | 120 | 3.52 | $Si_3N_4$, $Mo_5Si_3$ |
| 3c (15% Mo) | 10 | 1700 | 120 | 3.55 | $Si_3N_4$, $Mo_5Si_3$ |
| 3d (5% Mo + AlN) | 10 | 1600 | 120 | 3.23 | $Si_3N_4$, $Mo_5Si_3$ |
| 3d (5% Mo + AlN) | 10 | 1700 | 120 | 3.31 | $Si_3N_4$, $Mo_5Si_3$, $MoSi_2$ |

EXAMPLE 3

The three-inch disks prepared from the powder mixtures described in Example 2 are ground to 4 mm thickness and 3 mm flex bars are cut and chamfored. Six flex bars prepared from each powder sample are tested to determine the four-point flexural strength at room temperature. The results given in Table III are an average of the measurements on six flex bars.

TABLE III

| Powder | Hot Pressing Conditions | | | Room Temp. Flex Strength (MPa) |
|---|---|---|---|---|
| | °C./min | Temp. (°C.) | Hold (min) | |
| 3d (5% Mo + AlN) | 10 | 1600 | 120 | 560 |
| 3b (10% Mo) | 10 | 1600 | 120 | 647 |
| 3c (15% Mo) | 10 | 1600 | 120 | 413 |
| 3c (15% Mo) | 10 | 1700 | 120 | 763 |

Four flex bars prepared from the same three-inch disks are heated in air at 1200° C. for a period of 100 hours and the amount of oxidation measured as an increase in weight. Oxidation is reported below in terms of the value obtained by dividing the weight increase of the test sample by its surface area. Samples having the best oxidation resistance are those with the lowest values in mg of mass gained per unit surface area. Oxidation values and flexural strengths reported in Table IV are an average of the measurements on four flex bars.

TABLE IV

| Powder | Wt. % | Hot Pressing Conditions | | | Oxidation (mg/cm$^2$) | RT Flex MPa After Oxidation |
|---|---|---|---|---|---|---|
| | | °C./min | Temp. (°C.) | Hold (min) | | |
| 3d (5% Mo + AlN) | 5 | 10 | 1700 | 120 | 4.455 | 340 |
| 3b (10% Mo) | 10 | 10 | 1600 | 120 | 4.193 | 591 |
| 3c (15% Mo) | 15 | 10 | 1600 | 120 | 3.669 | 382 |

Strength retention of sample 3b (10% Mo) is 91% compared to the nonoxidized sample in Example 3. Strength retention of sample 3c (15% Mo) is 92% compared to the nonoxidized sample in Example 3. Samples containing the largest amount of silicide exhibit the least weight gain per unit surface area, indicating that larger amounts of silicide impart greater oxidation resistance.

I claim:

1. A sintered ceramic product consisting essentially of (a) from about 20 to about 98% silicon nitride, (b) from about 1 to about 80% $Mo_5Si_3$, and (c) from 0.02 to about 20% of at least one oxide, nitride or silicate of an element selected from IUPAC groups 2, 3, 4, 13 or the lanthanide series, all percentages being by weight based on the total weight of the product.

2. The product of claim 1, wherein greater than zero percent and up to 50% by weight of the silicon nitride is replaced by at least one refractory carbide, nitride other than silicon nitride, or boride.

3. The product of claim 2 wherein the refractory nitride is aluminum nitride.

4. The product of claim 1 consisting essentially of 50–93% by weight of silicon nitride, 5–25% by weight of $Mo_5Si_3$, 1–10% by weight of at least one oxide of IUPAC group 3 elements or the lanthanide series, and 1–5% by weight of aluminum oxide.

5. The product of claim 4 wherein fully stabilized zirconium oxide, partially stabilized zirconium oxide or hafnium oxide is substituted for all or part of the oxide of IUPAC group 3 elements or the lanthanide series.

6. The product of claim 1 consisting essentially of 50–93% by weight of silicon nitride, 5–25% by weight of $Mo_5Si_3$, 1–10% by weight of at least one oxide of IUPAC group 2 elements or the lanthanide series, and 1–5% by weight of aluminum oxide.

7. The product of claim 6 wherein fully stabilized zirconium oxide, partially stabilized zirconium oxide or hafnium oxide is substituted for all or part of the oxide of IUPAC group 2 elements or the lanthanide series.

8. The product of claim 1 having a room temperature flexural strength of at least 400 MPa.

9. The product of claim 2 having a room temperature flexural strength of at least 400 MPa.

10. A cutting tool prepared from the sintered ceramic product of claim 1.

11. A cutting tool prepared from the sintered ceramic product of claim 2.

* * * * *